US008804832B2

(12) United States Patent  (10) Patent No.: US 8,804,832 B2
Nakagami et al.  (45) Date of Patent: Aug. 12, 2014

(54) IMAGE PROCESSING APPARATUS, IMAGE PROCESSING METHOD, AND PROGRAM

(75) Inventors: Ohji Nakagami, Tokyo (JP); Junichi Tanaka, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 12/597,792

(22) PCT Filed: May 21, 2008

(86) PCT No.: PCT/JP2008/059314
§ 371 (c)(1),
(2), (4) Date: Oct. 27, 2009

(87) PCT Pub. No.: WO2008/155972
PCT Pub. Date: Dec. 24, 2008

(65) Prior Publication Data
US 2010/0118963 A1  May 13, 2010

(30) Foreign Application Priority Data
Jun. 18, 2007  (JP) ................................. 2007-160590

(51) Int. Cl.
*H04N 7/12* (2006.01)
*G06K 9/32* (2006.01)

(52) U.S. Cl.
USPC ..................................... 375/240.16; 382/299

(58) Field of Classification Search
CPC ............... G06T 3/40; H04N 19/00721; H04N 5/23245; H04N 5/343; H04N 5/765; H04N 7/0125; H04N 7/014; H04N 9/8042; H04N 19/006; H04N 19/00757; H04N 19/00781; H04N 1/217; H04N 2101/00; H04N 2201/3247; H04N 2201/3267; H04N 7/50
See application file for complete search history.

(56) References Cited

U.S. PATENT DOCUMENTS 5,809,202 A    9/1998  Gotoh et al.
5,821,986 A  * 10/1998  Yuan et al. ................. 348/14.12
(Continued)

FOREIGN PATENT DOCUMENTS

JP          7-23322      1/1995
JP          8-298644    11/1996
(Continued)

OTHER PUBLICATIONS

Supplementary European Search Report issued Dec. 23, 2010, in Munich in corresponding EP 08 76 4437.
(Continued)

*Primary Examiner* — Behrooz Senfi
*Assistant Examiner* — Mohammed Jebari
(74) *Attorney, Agent, or Firm* — Sherr & Jiang, PLLC

(57) ABSTRACT

There is provided an image processing apparatus including an acquiring unit for acquiring moving image data containing a plurality of successive frames, and one or a plurality of image data corresponding to the frames and having a spatial resolution higher than the frames; a motion prediction unit for detecting a motion vector between the frames using the moving image data; and an image generation unit for generating motion compensated image data corresponding to a predetermined frame based on the image data and the motion vector. The image generation unit generates the motion compensated image data being positioned between the predetermined frame and a frame corresponding to the image data and corresponding to the frame, and generates motion compensated image data corresponding to the predetermined frame based on the motion compensated image data and the motion vector.

18 Claims, 7 Drawing Sheets

(56) References Cited

U.S. PATENT DOCUMENTS

| | | | |
|---|---|---|---|
| 6,285,804 B1 * | 9/2001 | Crinon et al. | 382/299 |
| 2002/0154697 A1 | 10/2002 | Jeon | |
| 2004/0264576 A1 | 12/2004 | Woods et al. | |
| 2005/0219642 A1 * | 10/2005 | Yachida et al. | 358/448 |
| 2006/0126952 A1 * | 6/2006 | Suzuki et al. | 382/233 |
| 2007/0189386 A1 | 8/2007 | Imagawa et al. | |

FOREIGN PATENT DOCUMENTS

| | | |
|---|---|---|
| JP | 11-234644 | 8/1999 |
| JP | 2004-312276 | 11/2004 |
| JP | 2004-312277 | 11/2004 |
| JP | 2005-318548 | 11/2005 |
| JP | 2007-096412 | 4/2007 |
| KR | 10-2006-0131796 | 12/2006 |
| WO | WO 2006/137253 A1 | 12/2006 |

OTHER PUBLICATIONS

International Search Report from the Japanese Patent Office in International Application No. PCT/JP2008/059314 mailed Aug. 26, 2008.

Mar. 19, 2014, Korean Office Action for related KR application No. 10-2009-7024642.

* cited by examiner

IMAGE PROCESSING APPARATUS, IMAGE PROCESSING METHOD, AND PROGRAM

TECHNICAL FIELD

The present invention relates to an image processing apparatus, an image processing method, and a program.

BACKGROUND ART

In recent years, a technique related to distribution of digital video data (hereinafter referred to as video data) has been greatly advancing. Specifically, development in the technique related to distribution and recording of high image quality video data is outstanding. Among them, attention has been given to the technique related to coding and decoding of the video data. The video data having high spatial resolution and temporal resolution has a very large data size and thus such video data is desirably distributed or recorded by being efficiently compressed after coding. The coding technique enabling the high image quality video data to be compressed at higher compression rate, and the decoding technique enabling reproduction at higher spatial resolution have been desired.

For instance, Patent Documents 1 and 2 disclose a basic technique for generating the video data having high spatial resolution and temporal resolution by combining first video data (e.g., moving image data etc.) which has low spatial resolution but high temporal resolution and second video data (e.g., series of still image data etc.) which has high spatial resolution but low temporal resolution. Such technique predicts the motion vector between frames from the first video data, and compensates the high frequency component of the first video data using the motion vector and the second video data. Such technique generates a frame of an arbitrary time point not contained in the second video data using the motion vector detected from the first video data and the frame of the second video data at a time point close to such arbitrary time point. Japanese Patent Application Laid-Open No. 2004-312276 and No. 2004-312277 include a description related to an image data recording and reproducing device for generating video data having high spatial resolution and temporal resolution using the above-described technique.

[Patent Document 1] Japanese Patent Application Laid-Open No. 2004-312276

[Patent Document 2] Japanese Patent Application Laid-Open No. 2004-312277

DISCLOSURE OF THE INVENTION

However, if the time interval at which each of a plurality of still image data is recorded is large, the motion vector is difficult to accurately predict, and thus high image quality video data is difficult to generate. In other words, since the amount of change in the moving body in the image data becomes greater the more the recorded time of the video data to generate is distant from the recorded time of the recorded still image data, the motion compensation using the high frequency component contained in the recorded high resolution still image becomes difficult to perform. For instance, if the time difference h between the recorded time of the still image data and the recorded time of the desired created picture becomes greater than 0.1 second, the compensation of the high frequency component by motion compensation becomes difficult to perform. If the number of recording of the high definition still image data increases, the amount of data to be saved obviously becomes enormous.

In light of the foregoing, it is desirable to provide a novel and improved image processing apparatus, an image processing method, and a program capable of realizing the motion compensation at high accuracy when executing the motion prediction using the low resolution image data series and executing the motion compensation using the high resolution image data to generate the high resolution image data even if the time of the image data to generate and the time of the high resolution image data are distant.

In order to solve the above issue, according to another embodiment of the present invention, there is provided an image processing apparatus including: an acquiring unit for acquiring moving image data containing a plurality of successive frames, and one or a plurality of image data corresponding to the frames and having a spatial resolution higher than the frames; a motion prediction unit for detecting a motion vector between the frames using the moving image data; and an image generation unit for generating motion compensated image data corresponding to a predetermined frame based on the image data and the motion vector.

The image generation unit generates the motion compensated image data being positioned between the predetermined frame and a frame corresponding to the image data and corresponding to the frame, and generates motion compensated image data corresponding to the predetermined frame based on the motion compensated image data and the motion vector.

The image generation unit may execute motion compensation in order from a frame corresponding to a time close to the image data, and sequentially generate motion compensated image data corresponding to the predetermined frame based on the motion compensated image data and the motion vector.

The image processing apparatus may further include a storage unit for recording the moving image data and the one or the plurality of image data. In this case, the acquiring unit may be configured to acquire the image data and the one or the plurality of image data recorded in the storage unit.

A first image data series having low spatial resolution and high temporal resolution may be recorded in the storage unit as the moving image data, and a second image data series having higher spatial resolution and lower temporal resolution than the first image data series may be recorded in the storage unit so as to correspond to the frame contained in the first image data series as the one or the plurality of image data.

The moving image generation unit may be configured to generate, with a frame contained in the first image data series and not contained in the second image data series as the predetermined frame, the image data corresponding to the predetermined frame, and enhance the temporal resolution of the second image data series.

An image data series obtained by down sampling an imaged image signal may be recorded in the storage unit as the moving image data.

The image generation unit may be configured to change a ratio of combining the predetermined frame, which is a reference source of the motion vector, and the image data, which is a reference destination of the motion vector, according to a difference amount in the motion compensation if the difference amount is greater than a predetermined value.

If a difference amount between the frame corresponding to the image data and the predetermined frame is smaller than a predetermined value, the image generation unit may be configured to output the image data as image data corresponding to the predetermined frame without performing motion compensation.

In order to solve the above issue, according to another embodiment of the present invention, there is provided an image processing method, including the steps of: acquiring moving image data containing a plurality of successive frames, and one or a plurality of image data corresponding to the frames and having a spatial resolution higher than the frames; detecting a motion vector between the frames using the moving image data; and generating motion compensated image data corresponding to a predetermined frame based on the image data and the motion vector.

In the image generation step, the motion compensated image data being positioned between the predetermined frame and a frame corresponding to the image data and corresponding to the frame is generated, and motion compensated image data corresponding to the predetermined frame is generated based on the motion compensated image data and the motion vector.

In order to solve the above issue, according to another embodiment of the present invention, there is provided a program which causes a computer to realize the functions of the image processing apparatus. A recording medium recorded with such program can be also provided.

The image processing apparatus generates a high resolute image from a time close to the recorded time of the already-recorded still image data, saves the high resolution image generated in the past in the frame memory, and generates a new high resolution image with reference again to the saved image. Through such sequentially executed process, high definition still image can be generated even at a time distant from the recorded time.

According to the embodiments of the present invention described above, when executing the motion prediction using the image data series of low resolution and executing the motion compensation using the image data of high resolution to generate the image data of high resolution, the motion compensation can be performed at high accuracy even if the time of the image data to be generated and the time of the high resolution image data are distant.

Figure 1:
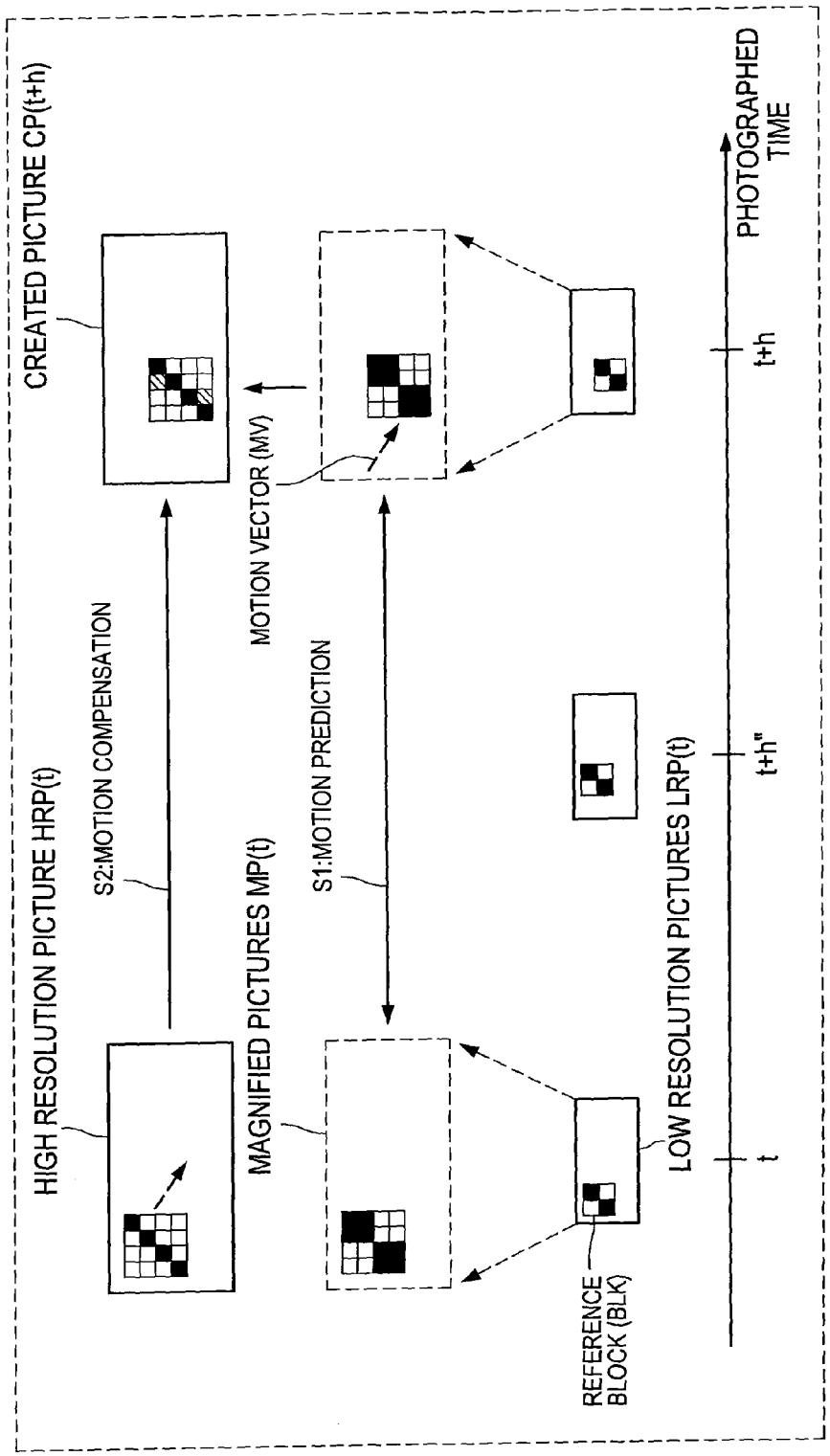
FIG. 1 is an explanatory view describing a generation method of a high resolution created picture.

DESCRIPTION OF REFERENCE NUMERALS 100 image processing apparatus
102 imaging lens
104 imaging element
106 image generation timing controller
108 display circuit
110 camera signal processing block
112 A/D converter
114 digital signal processing circuit
120 moving image recording and reproducing block
122, 132 storage unit
124 moving image compression/decompression circuit
126 image density conversion circuit
130 still image recording and reproducing block
134 still image compression/decompression circuit
202 image generation circuit
204 frame memory
212 motion prediction unit
214 motion compensation unit
HRP high resolution picture
LRP low resolution picture
MP magnified picture
CP, CP' created picture

BEST MODE FOR CARRYING OUT THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Generation Method of High Resolution Image)

First, prior to describing an image processing apparatus and an image processing method according to the embodiment of the present invention, an idea of using image data series (hereinafter referred to as moving image data) in which an image of low spatial resolution is successively recorded and image data of high spatial resolution (hereinafter referred to as still image data or HRP (High Resolution Picture)) discretely recorded in correspondence to an appropriate frame (hereinafter referred to as LRP (Low Resolution Picture)) contained in the moving image data to generate image data of high spatial resolution (hereinafter referred to as CP (Created Picture) or high resolution created picture) corresponding to an arbitrary frame contained in the moving image data will be briefly described with reference to FIG. 1. FIG. 1 is an explanatory view showing one example of a generation method of the high resolution image.

In FIG. 1, a high resolution picture HRP(t), low resolution pictures LRP(t), LRP(t+h), magnified pictures MP(t), MP(t+h), and a created picture CP(t+h) are illustrated. The character in the parentheses represent the photographed time. For instance, the created picture CP(t+h) represents the created picture corresponding to the low resolution picture LRP(t+h) photographed at time t+h.

The created picture CP is image data created by executing motion compensation using the motion vector detected using the low resolution picture LRP and the high resolution picture HRP. As shown in FIG. 1, the motion vector (MV) between time t and time t+h is detected using the magnified picture MP(t) created by magnifying the low resolution picture LRP(t) and the magnified picture MP(t+h) created by magnifying the low resolution picture LRP(t+h) (S1). Then, a reference block of the high resolution picture HRP(t) corresponding to a reference block (BLK) of the low resolution picture LRP(t) is extracted based on the motion vector MV. The pixels of the reference block and the pixels of the magnified picture MP(t+h) are then combined at a predetermined ratio to create the created picture (CP(t+h)) (S2).

In the above-described example, the motion prediction and the motion compensation are executed using substantially different images. The magnified picture MP created by magnifying the low resolution picture LRP magnifies the spatial resolution same as the high resolution picture HRP, but lacks in high frequency component compared to the high resolution picture HRP. Thus, a deviation may occur in the motion vector detected using the magnified picture MP and the motion vector the high resolution picture HRP is to essentially have. In particular, if the accuracy of the motion prediction is low, the position of the reference block in the high resolution picture HRP shifts, and thus a remarkable noise is added to the high frequency component of the created picture CP created through motion compensation.

Thus, a devisal of suppressing the noise from being added due to motion compensation when executing motion compensation based on a plurality of image data having spatial resolutions different from each other is desired. The error of the motion vector becomes large when the time t at which the high resolution picture HRP(t) is photographed and the time t+h at which the created picture CP(t+h) is to be created are distant. A devisal of obtaining a high definition created picture CP(t+h) when the time interval h is large is thus desired.

As hereinafter described, the image processing apparatus according to one embodiment of the present invention first executes the motion prediction and the motion compensation on the low resolution picture LRP(t+h") photographed at a time close to the time t the high resolution picture HRP(t) is photographed to generate a tentative created picture CP'(t+h"), and further executes the motion prediction and the motion compensation based on such tentative created picture CP'(t+h). The created picture CP(t+h) at the desired time t+h can be generated at high accuracy by sequentially repeating such process. This is because the time interval between frames referenced when executing one motion prediction is short, and the accuracy of the motion prediction enhances. The specific function configuration of the image processing apparatus will be described below.

EMBODIMENTS

An image processing apparatus 100 according to one embodiment of the present invention will be described in detail below.
[Apparatus Configuration of Image Processing Apparatus 100]

Figure 2:
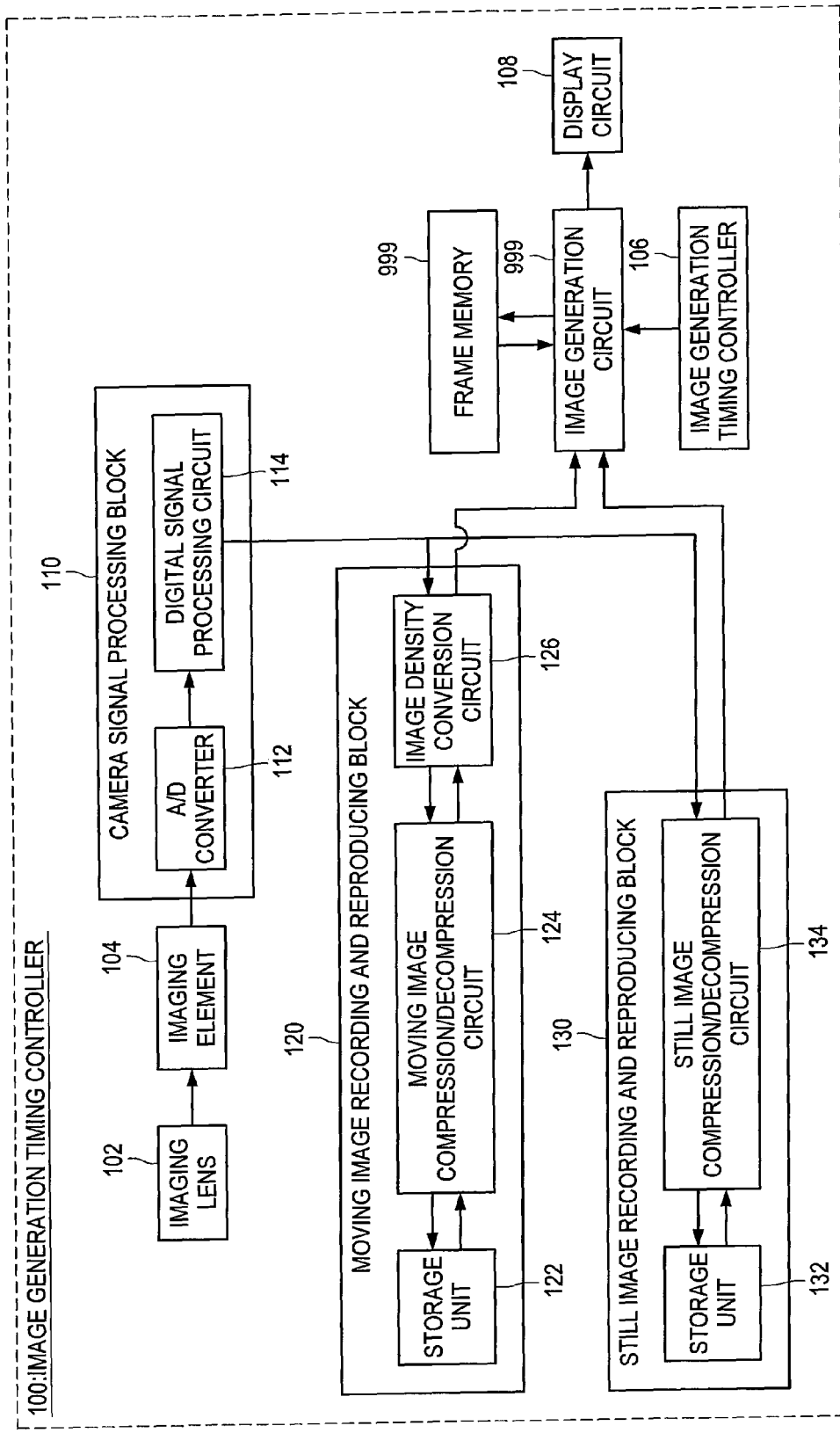
FIG. 2 is an explanatory view showing an apparatus configuration of an image processing apparatus according to one embodiment of the present embodiment.

First, the apparatus configuration of the image processing apparatus 100 according to the present embodiment will be described with reference to FIG. 2. FIG. 2 is an explanatory view showing one example of the apparatus configuration of the image processing apparatus 100 according to the present embodiment.

As shown in FIG. 2, the image processing apparatus 100 mainly includes an imaging lens 102, an imaging element 104, a camera signal processing block 110, a moving image recording and reproducing block 120, a still image recording and reproducing block 130, an image generation circuit 202, a frame memory 204, an image generation timing controller 106, and a display circuit 108.

The imaging lens 102 is an optical lens for forming an image (hereinafter referred to as collected image) of a subject by collecting light. The imaging element 104 is a photoelectric element for converting the light collected by the imaging lens 102 to an electrical signal. A semiconductor element such as CCD image sensor (Charge Coupled Device Image Sensor) and CMOS image sensor (Complementary Metal Oxide Semiconductor Image Sensor) is used for the imaging element 104.

The imaging element 104 has greater number of pixels than the number of effective pixels of the spatial resolution of the moving image data. The display circuit 108 causes a display device (not shown) to display the image data when recording or reproducing the image data or when checking the image data. The image generation timing controller 106 is a device for the operator to make an instruction to acquire the still image data while reproducing the moving image data.
(Camera Signal Processing Block 110)

As shown in FIG. 2, the camera signal processing block 110 includes an A/D converter 112 and a digital signal processing circuit 114.

The A/D converter 112 is an analog-to-digital converter for converting an input analog signal to a digital signal, and outputting the same. The A/D converter 112 converts the analog signal of the collected image input from the imaging element 104 to the digital signal, and outputs the same to the digital signal processing circuit 114. The digital signal processing circuit 114 performs processes such as white balance adjustment and gamma correction on the digital signal (hereinafter referred to as image data) of the collected image input from the A/D converter 112.
(Moving Image Recording and Reproducing Block 120)

As shown in FIG. 2, the moving image recording and reproducing block 120 includes an image density conversion circuit 126, a moving image compression/decompression circuit 124, and a storage unit 122.

The image density conversion circuit 126 performs a decimation process (e.g., inter-frame differential coding etc.) on the series of image data (moving image data) input from the digital signal processing circuit 114 when recording the moving image data. The image density conversion circuit 126 outputs the moving image data after the decimation process to the moving image compression/decompression circuit 124. The moving image compression/decompression circuit 124 performs compression process on the moving image data of after decimation input from the image density conversion circuit 126 and records the compressed moving image data in the storage unit 122.

When reproducing the moving image data, the moving image compression/decompression circuit 124 reads out the moving image data recorded on the storage unit 122 and performs decompression process thereon. The moving image compression/decompression circuit 124 outputs the decompressed moving image data to the image density conversion circuit 126. The image density conversion circuit 126 performs an interpolation process (e.g., restoring differenced data) on the moving image data input from the moving image compression/decompression circuit 124.
(Still Image Recording and Reproducing Block 130)

As shown in FIG. 2, the still image recording and reproducing block 130 includes a still image compression/decompression circuit 134 and a storage unit 132. The storage unit 132 may realize the function using the storage device common with the storage unit 122.

When recording the still image data, the still image compression/decompression circuit 134 performs compression process on the image data input from the digital signal processing circuit 114 and records in the storage unit 132. When reproducing the still image data, the still image compression/decompression circuit 134 reads out the image data recorded in the storage unit 122 and performs decompression process thereon.

(Image Generation Circuit 202)

Although not clearly shown in the figure, the image generation circuit 202 includes a motion prediction unit 212 and a motion compensation unit 214. The motion compensation unit 214 serves an image generation unit.

The motion prediction unit 212 detects the motion vector by executing the motion prediction between frames on the moving image data transmitted from the moving image recording and reproducing block 120. For instance, the motion prediction unit 212 selects the still image data recorded at the time closest to the frame recorded at a predetermined time. The motion prediction unit 212 detects the motion vector between frames by executing the motion prediction between the frame corresponding to the still image data and the frame recorded at a predetermined time. In this case, the motion prediction unit 212 magnifies each frame (LRP) to reference to convert to the magnified picture (MP), and detects the motion vector between the relevant magnified pictures.

As another example, the motion prediction unit 212 can extract a plurality of still image data recorded at a time point close to the frame recorded at a predetermined time, and then select the frame corresponding to the still image data most approximate to the frame recorded at the predetermined time. The motion prediction unit 212 may detect the motion vector between frames by executing the motion prediction between the frame corresponding to the selected still image data and the frame recorded at the predetermined time. The motion prediction unit 212 may detect the motion vector between frames without magnifying each frame (LRP), and magnify the motion vector so as to adapt to the spatial resolution of the created picture (CP).

The motion compensation unit 214 executes motion compensation based on the information of the motion vector input from the motion prediction unit 212 and the still image data input from the still image recording and reproducing block 130. For instance, the motion compensation unit 214 specifies the reference block of the still image data corresponding to the reference block of the frame recorded at the predetermined time based on the motion vector. The motion compensation unit 214 generates the image data (created picture CP') by combining the specified reference block of the still image data and the reference block of the frame recorded at the predetermined time at a predetermined ratio.

Figure 3:
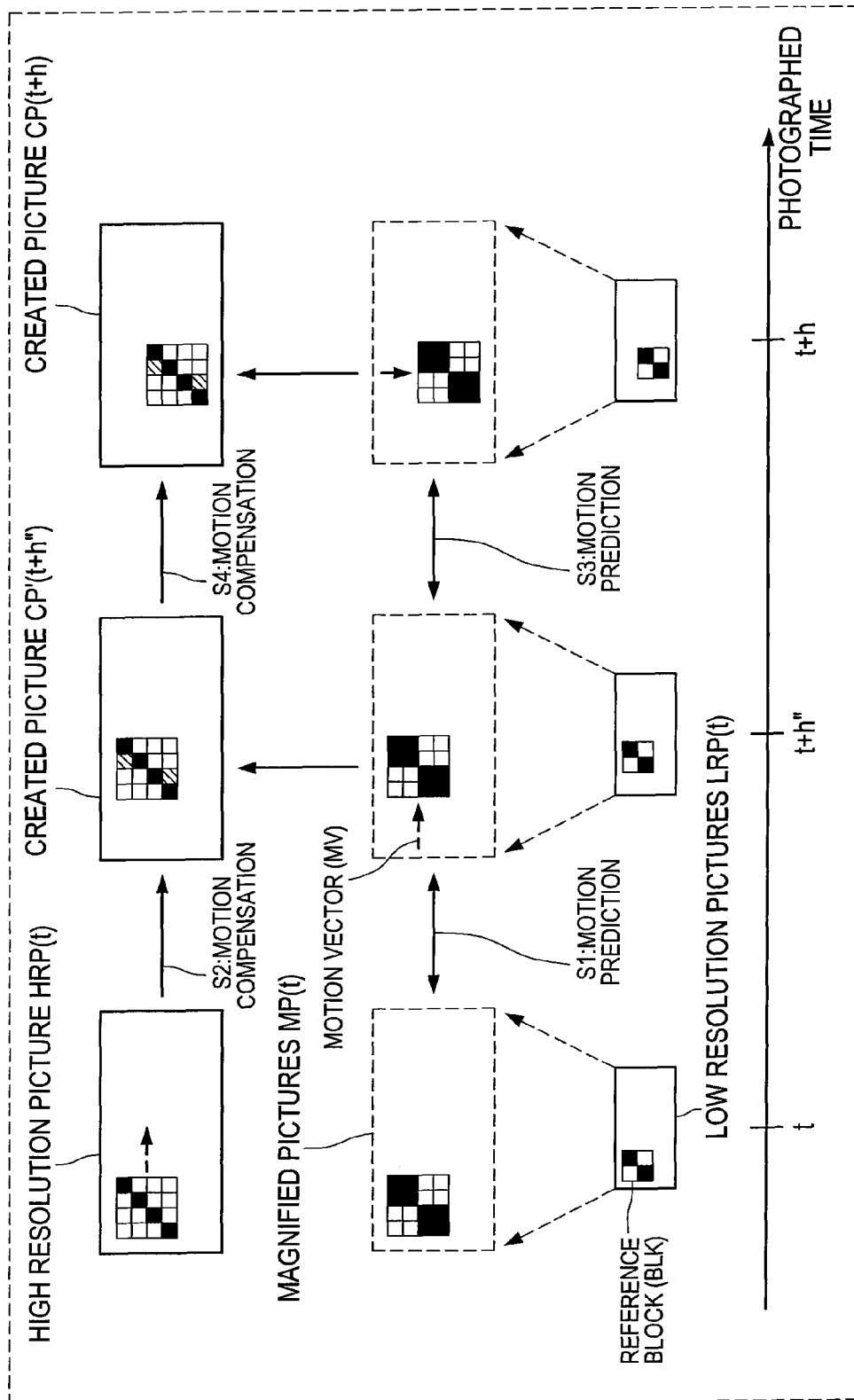
FIG. 3 is an explanatory view describing an operation of an image generation circuit according to the present embodiment.

When generating the created picture CP(t+h), the image generation circuit 202 develops the created picture CP'(t+h") (t<h"<h) generated in the past in the frame memory 204. That is, as shown in FIG. 3, the image generation circuit 202 once generates an intermediate created picture CP'(t+h") using the magnified picture MP(t+h") temporally close to the high resolution picture HRP(t) instead of generating the created picture CP(t+h) directly using the high resolution picture HRP(t), and saves such created picture CP'(t+h") in the frame memory 204 for use. The image generation circuit 202 executes the motion prediction between the magnified pictures MP(t+h) and MP(t+h"), and generates the desired created picture CP(t+h) based on the detected motion vector and the intermediate created picture CP'(t+h"). The created picture CP(t+h) is then output to the display circuit 108.

When storing the created picture CP'(t+h") in the frame memory, the image generation circuit 202 may change the method of storing according to the processing unit to use. For instance, the entire image may be stored or only the pixel region with motion may be stored to save the memory amount.

Furthermore, when generating the created picture CP' or CP, the image generation circuit 202 can monitor the difference amount of the magnified picture MP corresponding to the created picture CP' or CP and the image of the reference destination. If the difference amount of the high resolution picture HRP and the magnified picture MP is small, the image generation circuit 202 outputs the high resolution picture HRP as is as the created picture CP' or CP. Similarly, if the difference amount of the created picture CP' and the magnified picture MP is small, the image generation circuit 202 can output the created picture CP' as is as the created picture CP. Such cases are situations that occur such as when a subject that is completely stationary is photographed.

When the recorded time of the created picture CP and the high resolution picture HRP is distant, the image generation circuit 202 according to the present embodiment sequentially generates an intermediate created picture CP' from the magnified picture MP corresponding to the time close to the recorded time of the high resolution picture HRP. Furthermore, the image generation circuit 202 executes the motion compensation using the intermediate created picture CP', and sequentially generates the intermediate created picture CP' to ultimately obtain a high definition created picture CP.

[Recording Operation of Image Data]

The recording operation of the image data by the image processing apparatus 100 according to the present embodiment will be briefly described below.

First, the operator instructs start of the recording operation to the image processing apparatus 100 (S10). In response to such instruction, the image processing apparatus 100 starts a continuous recording of the frames configuring the moving image data (S12). The image processing apparatus 100 acquires a collected image through the imaging lens 102 (S14). The image processing apparatus 100 performs photoelectric conversion on the collected image by the imaging element 104 to generate an analog signal (S16). The image processing apparatus 100 inputs the analog signal to the A/D converter 112 to convert to a digital signal (S18). The image processing apparatus 100 then inputs the digital signal to the digital signal processing circuit 114, and executes processes such as white balance adjustment and gamma correction on the image data corresponding to such digital signal (S20). According to such processes, the image processing apparatus 100 can accumulate the image data and form the moving image data.

The image processing apparatus 100 performs the decimation process on the moving image data by the image density conversion circuit 126 (S22). When executing step S22, the number of effective pixels in each video signal format such as NTSC (National Television Standard Committee) method, PAL (Phase Alternation by Line) method, or ISDB (Integrated Services Digital Broadcasting) method is obtained. The image processing apparatus 100 then compression processes the moving image data subjected to the decimation process by the moving image compression/decompression circuit 124 (S24), and records in the storage unit 122 (S25). The image processing apparatus 100 also acquires the image data (still image data) intermittently at a predetermined time interval and performs the compression process by the still image compression/decompression circuit 134 (S32), and records in the storage unit 132 (S34).

[Reproducing Operation of Image Data]

The reproducing operation of the image data by the image processing apparatus 100 according to the present embodiment will be briefly described below.

The operator instructs start of the reproducing operation to the image processing apparatus 100 using the image generation timing controller 106 (S50). In response to such instruction, the image processing apparatus 100 starts to generate high image quality image data having a higher spatial resolution than the moving image data and of a recording time point at which the still image data is not recorded (S52). The image processing apparatus 100 reads out the moving image data of after the compression process recorded in the storage unit 122 (S54), and executes the decompression process by the moving image compression/decompression circuit 124 (S56). The image processing apparatus 100 then executes the interpolation process of the moving image data subjected to the decompression process by the image density conversion circuit 126 (S58). According to step S58, each frame of the moving image data is converted to the image data having the same number of pixels as the still image data. The moving image data is then transmitted to the image generation block 140 (S60).

The image processing apparatus 100 then reads out and decompresses the still image data recorded in the storage unit 132 by the still image compression/decompression circuit 134 (S72), and transmits to the image generation block 140 (S74).

(Operation of Image Generation Circuit 202)

The processing operation of the image generation circuit 202 will now be described with reference to FIG. 3. FIG. 3 is an explanatory view describing the processing operation of the image generation circuit 202.

FIG. 3 shows a high resolution picture HRP(t), a plurality of low resolution pictures LRP(t), LRP(t+h"), LRP(t+h), an intermediate created picture CP'(t+h"), and a desired created picture CP(t+h) so as to correspond to the photographed time. FIG. 3 specifically describes the processing operation of generating the created picture CP(t+h) corresponding to the low resolution picture LRP(t+h) of time t+h.

The high resolution picture HRP is assumed to have number of horizontal pixels of N, number of vertical pixels of M, and frame rate of 1/ΔT[fps]. The low resolution picture LRP is assumed to have number of horizontal pixels of n, number of vertical pixels of m, and frame rate of 1/Δt[fps]. Each variable is assumed to satisfy the relationship of N≥n, M≥m, ΔT≥t. Furthermore, the variable h is assumed to satisfy the relationship 0≤h≤ΔT.

The method of generating the created picture CP(t+h) of time t+h will be described below with reference to the example of FIG. 3. The processing method of the image processing apparatus 100 according to the present embodiment is not limited thereto. The created picture CP(t+h) can be generated with reference to also the high resolution picture HRP(t+ΔT) of other time t+ΔT (not shown). In this case, the image processing apparatus 100 can perform the process of selecting the high resolution picture HRP to be referenced according to the magnitude, speed and the like of the motion of the subject.

(S1)

First, the image processing apparatus 100 executes the motion prediction using the low resolution pictures LRP(t) and LRP(t+h") by the motion prediction unit 212. In this case, the motion prediction unit 212 magnifies the low resolution pictures LRP(t) and LRP(t+h") to generate the magnified pictures MP(t) and MP(t+h"). The motion prediction unit 212 then compares the magnified pictures MP(t) and MP(t+h") to detect the motion vector MV between MP(t) and MP(t+h"). The motion prediction method includes block matching method, phase correlation method, optical flow method, or the like.

(S2)

The image processing apparatus 100 then executes the motion compensation using the motion vector MV and the high resolution picture HRP(t) by the motion compensation unit 214. The motion compensation unit 214 uses the motion vector MV to specify the reference block of the high resolution picture HRP(t) corresponding to the reference block of the magnified picture MP(t+h"). The motion compensation unit 214 combines such reference block and the reference block of the magnified picture MP(t+h") at a predetermined ratio, and generates an intermediate created picture CP' (t+h").

(S3)

The image processing apparatus 100 then executes the motion prediction using the low resolution pictures LRP(t+h) and LRP(t+h") by the motion prediction unit 212. In this case, the motion prediction unit 212 magnifies the low resolution pictures LRP(t+h) to generate the magnified pictures MP(t+h). The motion prediction unit 212 then compares the magnified pictures MP(t+h") and MP(t+h) to detect the motion vector MV between MP(t+h") and MP(t+h).

(S4)

The image processing apparatus 100 then executes the motion compensation using the motion vector MV and the intermediate created picture CP' (t+h") by the motion compensation unit 214. The motion compensation unit 214 uses the motion vector MV to specify the reference block of the created picture CP' (t+h") corresponding to the reference block of the magnified picture MP(t+h). The motion compensation unit 214 combines such reference block and the reference block of the magnified picture MP(t+h) at a predetermined ratio, and generates an ultimate created picture CP (t+h).

If the time interval h between the created picture CP(t+h) and the high resolution picture HRP(t) is very short, noise barely generates in the created picture CP(t+h) due to the motion prediction accuracy even if motion compensation is performed using such high resolution picture HRP(t). However, if the time interval h is long, the possibility the noise generates in the information of the high frequency component contained in the high resolution picture HRP is high. That is, there is a possibility the correlation between the reference block of the high resolution picture HRP used in the motion compensation and the reference block of the magnified picture MP corresponding thereto may lower depending on the accuracy of the motion prediction.

Generally, the process of motion prediction is such that more accurate motion prediction can be performed the lesser the motion of the subject, that is, the smaller the temporal distance from the prediction source to the prediction destination. Therefore, the accuracy of the prediction is obviously more satisfactory in the motion prediction performed from the magnified picture MP(t+h") to the magnified picture MP(t) than in the motion prediction performed from the magnified picture MP(t+h) to the magnified picture MP(t). The quality of the created picture CP'(t+h") generated using the motion prediction result from the magnified picture MP(t+h") to the magnified picture MP(t) is thus higher than the created picture generated using the motion prediction result from the magnified picture MP(t+h) to the magnified picture MP(t).

Figure 4:
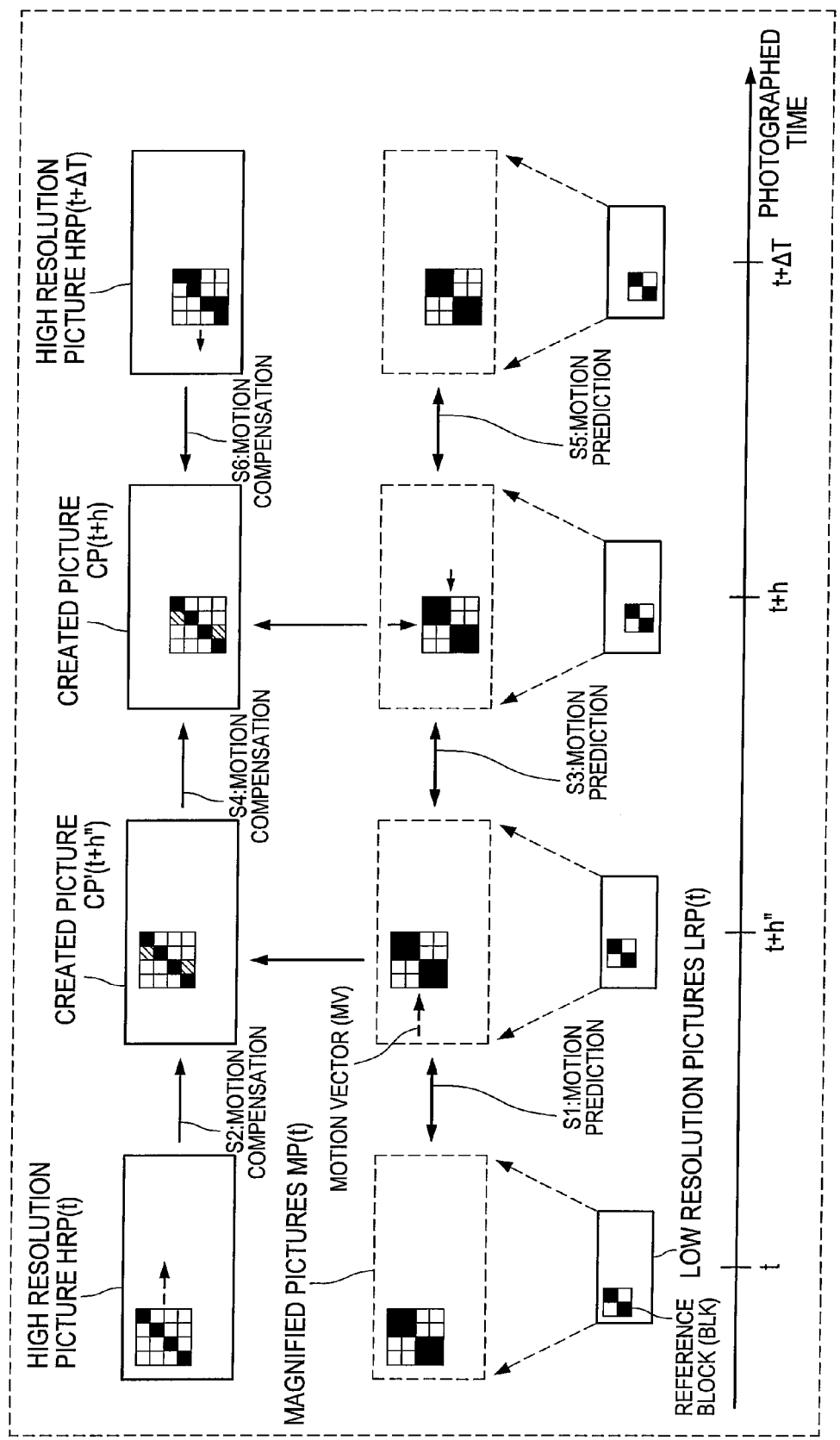
FIG. 4 is an explanatory view describing an operation of the image generation circuit according to the present embodiment.

Furthermore, as shown in the example of FIG. 4, the image generation circuit 202 can also reference an image other than the image positioned on the temporally back side when generating the created picture CP' or CP. An example of performing the motion prediction and the motion compensation with reference to the image positioned on the temporally back side has been described, but the image positioned on the front side may be referenced. Both front and back images may be referenced. The image generation circuit 202 can also generate the created picture CP' or CP with reference to a plurality of images positioned on the temporally front side or back side.

The image generation circuit 202 can also perform the process of sequentially generating an intermediate created picture CP' at a very fine time interval to reach the ultimate created picture CP.

Various modifications can be made in the image generation circuit 202 according to the present embodiment. For instance, if the high resolution picture HRP(t+ΔT) exists at time t+ΔT(h<ΔT), the image generation circuit 202 compares the created picture CP motion compensated from the front side based on the high resolution picture HRP(t+ΔT) and the created picture CP by sequentially motion compensating from the back side with the above method, thereby selecting the image of higher image quality. In view of the application of selection and the like, the image generation circuit 202 can compare the magnified pictures MP(t), MP(t+h"), MP(t+ΔT) and the like at predetermined times t, t+h", t+ΔT, and monitor the difference value thereof.

In motion prediction, the image generation circuit 202 can combine bidirectional prediction process. That is, the image generation circuit 202 executes the motion compensation based on the motion vector on a plurality of prediction sources, and weights and averages the pixel values of the motion compensation. As a simple example, the pixel C after prediction is obtained according to equation (1) with respect to the prediction source pixel A and the prediction source pixel B.

$$C=(A+B)/2 \quad (1)$$

This is a method of taking an average value in which the proportion of weight is the same. Generally, the differential energy can be reduced in the bidirectional prediction compared to the unidirectional prediction. This is widely known in association with the image compression technique such as MPEG (Moving Picture Experts Group). In the present embodiment as well, consideration is made in enhancing the quality of the created picture CP by combining and using the bidirectional prediction. The prediction direction of two vectors may be set in the temporally same direction (forward or backward) as in the bidirectional prediction technique known in H.264 and the like.

In generating the created picture CP, a method of taking the average of two high resolution pictures HRP(t) and HRP(t+ΔT) and using the generated image for the created picture CP(t+h) is considered as a method of relatively simple bidirectional prediction. This method is effective on a video where the subject is stationary and fade is contained.

If the subject includes a moving object, the image generation circuit 202 may execute the bidirectional prediction on the magnified pictures MP(t+h), MP(t+h"), MP(t), and execute the motion compensation based on the high resolution pictures HRP(t) and HRP(t+ΔT). The image generation circuit 202 can enhance the image quality of the created picture CP(t+h) by using the motion information of the subject between the magnified pictures MP(t+h) and MP(t), the motion information of the subject between MP(t+h) and MP(t+ΔT), or the high frequency component of a plurality of intermediately generated created pictures CP'.

Figure 5:
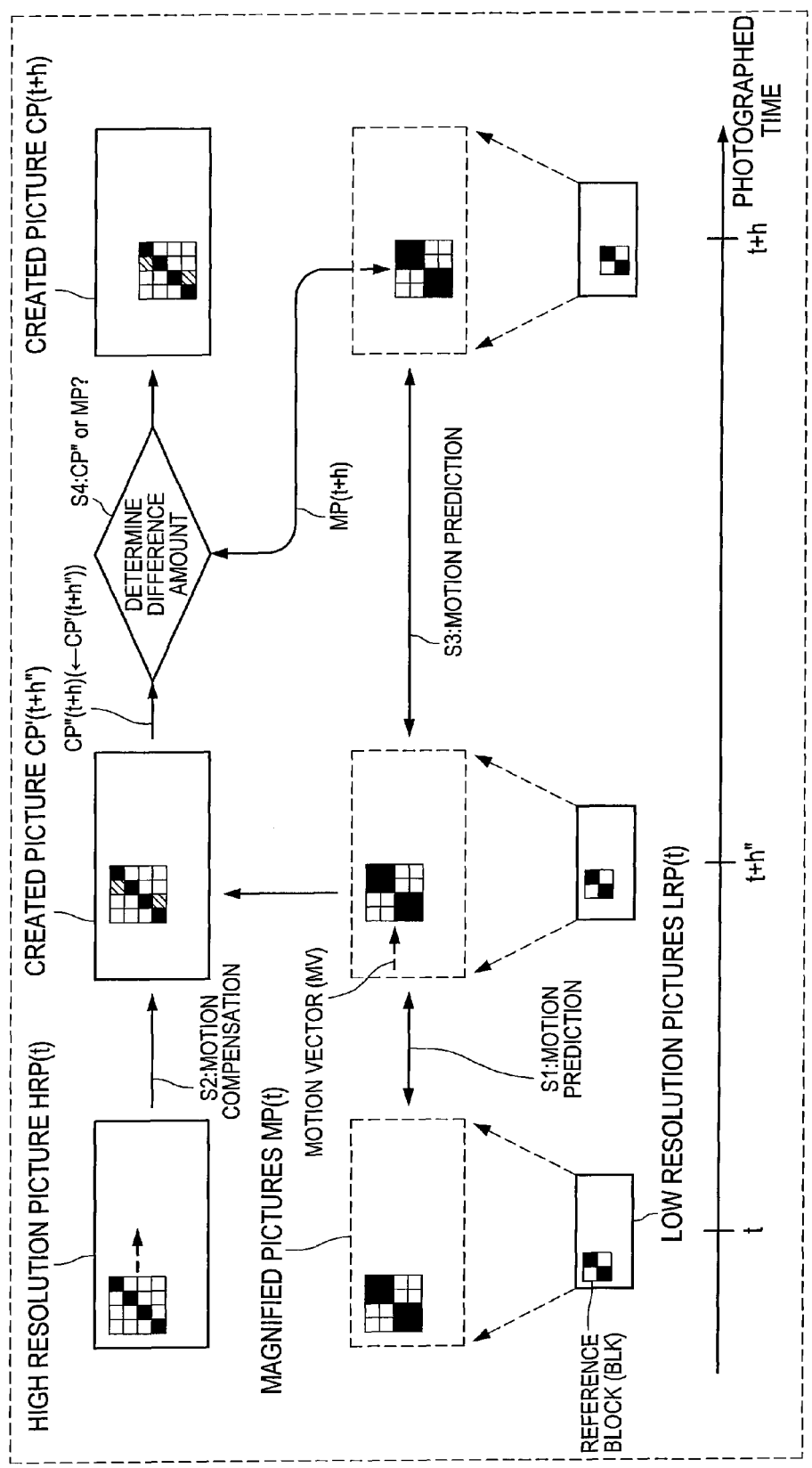
FIG. 5 is an explanatory view describing an operation of the image generation circuit according to the present embodiment.

Moreover, as shown in FIG. 5, when generating the created picture CP, the image generation circuit 202 may determine the accuracy of the motion prediction by the difference value of the image motion compensated based on the intermediately generated created picture CP' and the magnified picture MP corresponding to the created picture CP, and output the magnified picture P as is as the created picture CP when the accuracy of the motion prediction is low.

(Image Processing Method)

Figure 6:
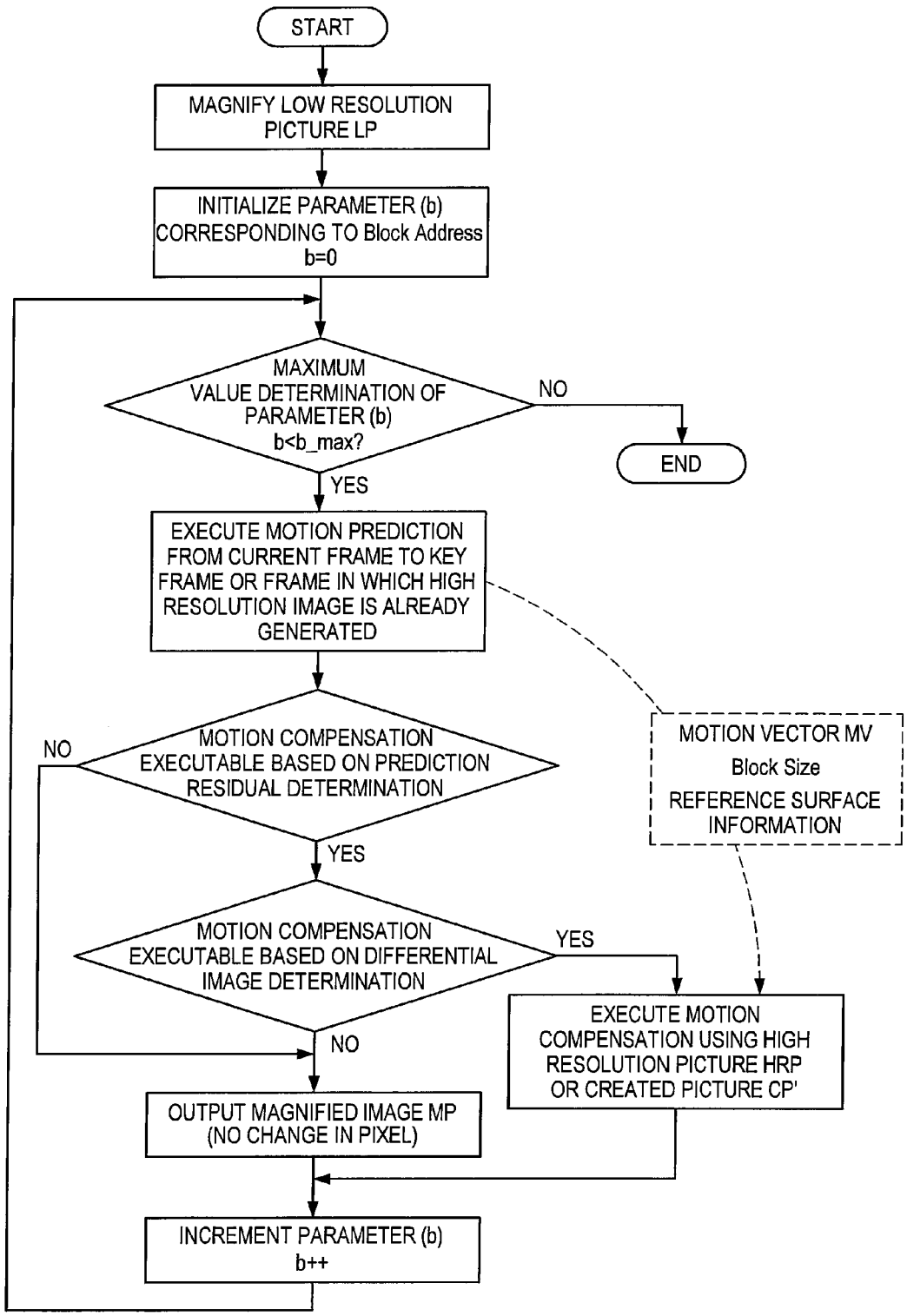
FIG. 6 is an explanatory view showing a generation method of a high resolution image according to the present embodiment.

The image processing method according to the present embodiment will now be described with reference to FIG. 6. FIG. 6 is an explanatory view describing a flow of image generation process according to the present embodiment.

First, the motion prediction unit 212 magnifies the low resolution picture LLRP to generate a magnified picture MP having the same spatial resolution as the high resolution picture HRP (S202). The parameter b indicating the position of the reference block is then initialized (S204). Whether or not the parameter b exceeds a maximum value b_max of the parameter b is then determined (S206). Here, b_max is the number of blocks contained in the frame.

If b≥b_max, the image generation circuit 202 terminates the image generation process. If b<b_max, the motion prediction unit 212 executes motion prediction from a current frame (MP(t+h")) to a key frame (MP(t)) or from a current frame (MP(t+h)) to the frame from which high resolution image is already generated (MP(t+h")) (S208). The reference frame of the motion prediction depends on the position of the reference source frame of the sequentially executed motion prediction. The image generation circuit 202 then determines whether or not the execution of the motion compensation is possible based on the magnitude of a prediction residual signal (S210).

If determined that the execution of the motion compensation is not possible in step S210, the motion compensation unit 214 outputs the magnified picture MP(t+h) of step S202 as the created picture CP(t+h) (S216). If determined that the execution of the motion compensation is possible in step S210, the motion compensation unit 214 executes a differential image determination (determination of "D>Th" or "D≤Th": see FIG. 5) using the resolution picture HRP(t) corresponding to the key frame and the magnified picture MP(t+h), and determines whether or not the execution of the motion compensation is possible (S212).

If determined that the execution of the motion compensation is possible in step S212, the motion compensation unit 214 executes the motion compensation using the high resolution picture HRP(t) or the created picture CP'(t+h") (S214). In this case, the motion compensation unit 214 uses the motion vector from the current frame to the key frame obtained in step S208, the unit block size, the reference frame information, or the like. If determined that the execution of the motion compensation is not possible in step S212, the motion compensation unit 214 outputs the magnified picture MP(t+h) as the created picture CP(t+h) (S216).

The image generation circuit 202 then increments the parameter b (S218), and again executes the processes from step S206. The image generation circuit 202 sequentially executes motion compensation, but determines whether or not the execution of the motion compensation is possible while executing the differential image determination during motion compensation. The image generation circuit 202 thus can suppress noise from generating in the created picture CP(t+h) due to motion compensation.

The function realized by each configuring elements of the image processing apparatus 100 can be realized by a predetermined program using an information processing device described below.

[Hardware Configuration]

Figure 7:
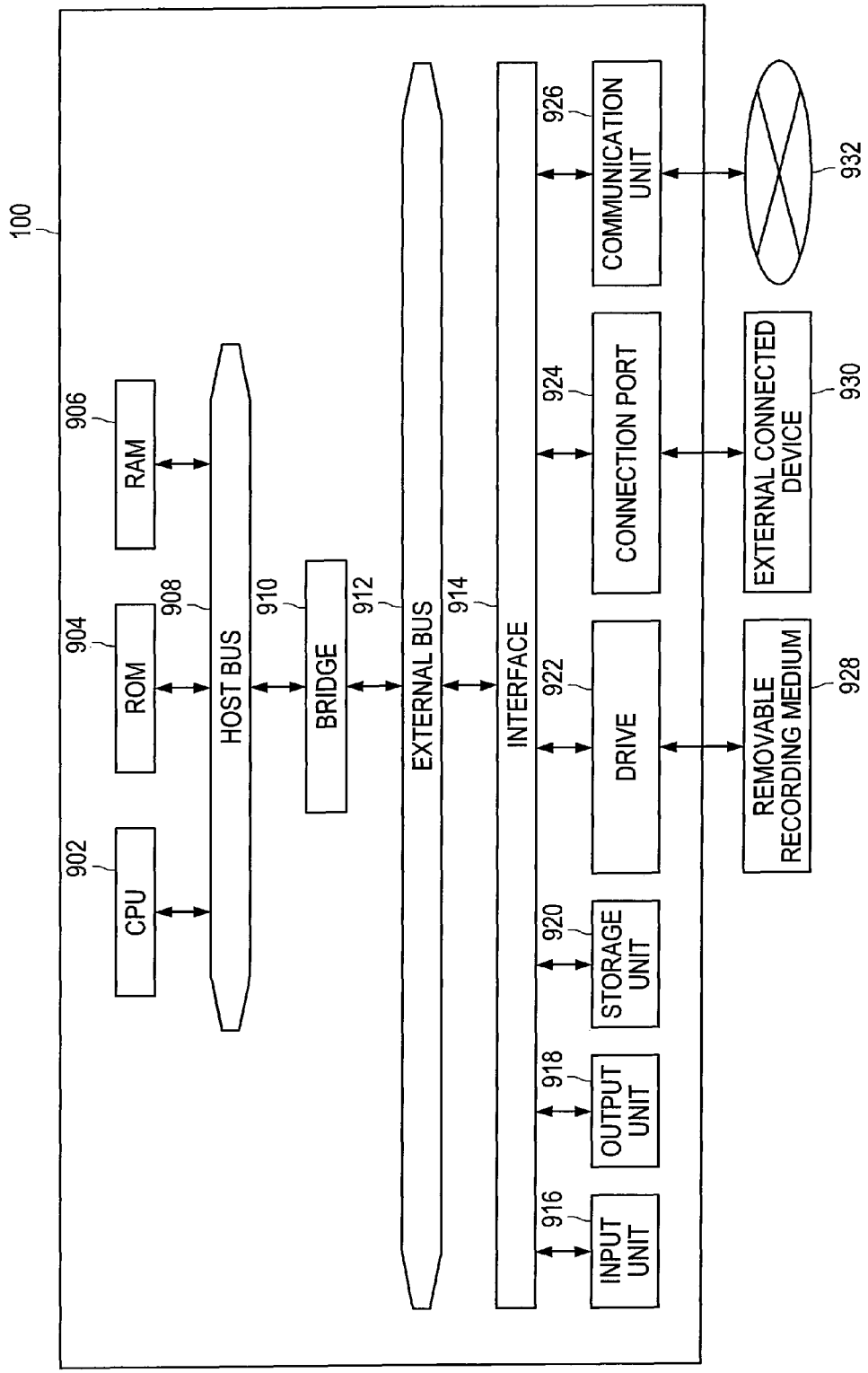
FIG. 7 is an explanatory view showing a hardware configuration example of an information processing device capable of realizing the functions of the image processing apparatus according to the present embodiment.

The functions of the image processing apparatus 100 can be realized by an information processing device having the hardware configuration shown in FIG. 7. FIG. 7 is an explanatory view showing a hardware configuration example of an information processing device capable of realizing the function of each configuring elements of the image processing apparatus 100.

As shown in FIG. 6, the information processing device is mainly configured by a CPU (Central Processing Unit) 902, a ROM (Read Only Memory) 904, a RAM (Random Access Memory) 906, a host bus 908, a bridge 910, an external bus 912, an interface 914, an input unit 916, an output unit 918, a storage unit 920, a drive 922, a connection port 924, and a communication unit 926.

The CPU 902 functions as a calculation processing device or a control device, and controls all or part of the operation of each component based on various types of programs recorded in the ROM 904, the RAM 906, the storage unit 920, or a removable recording medium 928. The ROM 904 stores programs to be read by the CPU 902, data used in calculation, and the like. The RAM 906 temporarily or permanently stores programs to be read by the CPU 902, various parameters that appropriately change when executing the program, and the like. Such components are mutually connected by the host bus 908 enabling high speed data transmission. The host bus 908 is connected to the external bus 912, in which the data transmission speed is relatively low, through the bridge 910.

The input unit 916 is an operation means such as mouse, keyboard, touch panel, button, switch, lever, and the like. The input unit 916 may be a remote controller means capable of transmitting control signals using infrared light or other electric waves. The input unit 916 is configured by an input control circuit and the like for transmitting the information input using the operation means to the CPU 902 as an input signal.

The output unit 918 is a device capable of visually or perceptually notifying the user of the acquired information such as a display device including CRT (Cathode Ray Tube), LCD (Liquid Crystal Display), PDP (Plasma Display Panel), or ELD (Electro-Luminescence Display), an audio output device including speaker or headphone, a printer, a portable telephone, a facsimile, or the like.

The storage unit 920 is a device for storing various types of data and is configured by a magnetic storage device such as hard disk drive (HDD), a semiconductor storage device, an optical storage device, a magneto-optical storage device, and the like.

The drive 922 is a device for reading out information recorded on the removable recording medium 928 such as magnetic disc, optical disc, magneto-optical disc, or semiconductor memory or writing information to the removable recording medium 928. The removable recording medium 928 may be a DVD media, Blu-ray media, HD-DVD media, Compact Flash (registered trademark), memory stick, SD memory card (Secure Digital memory card), or the like. The removable recording medium 928 may also be an IC card (Integrated Circuit Card), an electronic device, or the like mounted with a non-contact type IC chip.

The connection port 924 is a USB (Universal Serial Bus) port, IEEE1394 port, SCSI (Small Computer System Interface), RS-232C port, or a port for connecting an external connected device 930 such as an optical audio terminal. The external connected device 930 may be a printer, a portable music player, a digital camera, a digital video camera, an IC recorder, or the like.

The communication unit 926 is a communication device for connecting to a network 932, and may be a wired or wireless LAN (Local Area Network), Bluetooth (registered trademark) or WUSB (Wireless USB) communication card, optical communication router, ADSL (Asymmetric Digital Subscriber Line) router, or various types of communication modem. The network 932 connected to the communication unit 926 is configured by wired or wirelessly connected network, and includes Internet, in-house LAN, infrared communication, broadcast, satellite communication, or the like.

It should be understood by those skilled in the art that various modifications, combinations, sub-combinations and alterations may occur depending on design requirements and other factors insofar as they are within the scope of the appended claims or the equivalents thereof.

For instance, in the description of the above-described embodiment, a method of executing the motion prediction and the motion compensation with reference to the backward frame has been mainly described, but the technical scope of the invention is not limited thereto, and the motion prediction and the motion compensation may be executed with reference to the forward frame or the forward and backward frames.

The invention claimed is:

1. An image processing apparatus, comprising:
a receiving unit for receiving first video data containing a plurality of frames and second video data having a spatial resolution higher than the frames contained in the first video data and a temporal resolution lower than the frames contained in the first video data;
an image conversion unit for magnifying the frames of the first video data to generate a plurality of magnified frames;
a motion prediction unit for detecting a motion vector between each sequential frame pair of the magnified frames; and
an image generation unit for, based on the second video data received by the receiving unit and the motion vector detected by the motion prediction unit, performing motion compensation in sequential order from one of the magnified frames associated with a time that corresponds to a time associated with the second video data, and sequentially generating motion compensated image data corresponding to the first video data based on the motion compensated frames and the motion vector,
wherein the image generation unit sequentially generates the motion compensated image data by combining, at a predetermined ratio, a reference block of a first frame of the second video data specified by a respective motion vector, and a corresponding reference block of a second frame of the plurality of magnified frames that is immediately subsequent in time to the first frame of the second video data and belonging to a corresponding respective frame pair of the magnified frames used to generate the respective motion vector, to thereby generate an intermediate created picture, and
wherein the predetermined ratio is based upon a difference amount between the reference block of the first frame of the second video data and the corresponding reference block of the second frame of the plurality of magnified frames.

2. The image processing apparatus according to claim 1, further comprising:
a storage unit for storing the first video data and the second video data, wherein the receiving unit receives the first video data and the second video data from the storage unit.

3. The image processing apparatus according to claim 2, wherein the storage unit stores image data obtained by down sampling an imaged image signal as the first video data.

4. The image processing apparatus according to claim 1, wherein if a difference amount between a predetermined frame contained in the first video data and a frame contained in the second video data is smaller than a predetermined value, the image generation unit outputs the image data corresponding to the predetermined frame without performing motion compensation on the second video data.

5. The image processing apparatus according to claim 1, wherein the image generation unit sequentially generates the motion compensated image data by repeating the combining by using the generated intermediate created picture as a next first frame of the second video data, to thereby generate an ultimate created picture.

6. The image processing apparatus according to claim 1, wherein the image generation unit sequentially generates the motion compensated image data by combining pixels of reference blocks of the second video data specified by respective motion vectors and pixels of corresponding reference blocks of the magnified frames at the predetermined ratio.

7. The image processing apparatus according to claim 1, wherein when the difference amount is less than a predetermined value, the image generation unit outputs the first frame of the second video data, without performing motion compensation, as the intermediate created picture.

8. The image processing apparatus according to claim 1, wherein the intermediate created picture is generated for the second video data to thereby increase the temporal resolution of the second video data.

9. An image processing method, comprising the steps of:
receiving first video data containing a plurality of frames and second video data having a spatial resolution higher than the frames contained in the first video data and a temporal resolution lower than the frames contained in the first video data;
magnifying the frames of the first video data to generate a plurality of magnified frames;
detecting a motion vector between each sequential frame pair of the magnified frames; and
performing, based on the second video data received in the receiving step and the motion vector detected in the motion prediction step, motion compensation in sequential order from one of the magnified frames associated with a time that corresponds to a time associated with the second video data, and sequentially generating motion compensated image data corresponding to the first video data based on the motion compensated frame and the motion vector,
wherein the motion compensated image data is sequentially generated by combining, at a predetermined ratio, a reference block of a first frame of the second video data specified by a respective motion vector, and a corresponding reference block of a second frame of the plurality of magnified frames that is immediately subsequent in time to the first frame of the second video data and belonging to a corresponding respective frame pair of the magnified frames used to generate the respective motion vector, to thereby generate an intermediate created picture,
wherein the predetermined ratio is based upon a difference amount between the reference block of the first frame of the second video data and the corresponding reference block of the second frame of the plurality of magnified frames.

10. The image processing method according to claim 9, wherein the motion compensated image data is sequentially generated by repeating the combining by using the generated intermediate created picture as a next first frame of the second video data, to thereby generate an ultimate created picture.

11. The image processing method according to claim 9, wherein the motion compensated image data is sequentially generated by combining pixels of reference blocks of the second video data specified by respective motion vectors and pixels of corresponding reference blocks of the magnified frames at the predetermined ratio.

12. The image processing method according to claim 9, wherein when the difference amount is less than a predetermined value, the first frame of the second video data is outputted, without performing motion compensation, as the intermediate created picture.

13. The image processing method according to claim 9, wherein the intermediate created picture is generated for the second video data to thereby increase the temporal resolution of the second video data.

14. A tangible, non-transitory computer-readable medium storing instructions that, when executed by at least one processor, cause the at least one processor to perform a method, comprising:
receiving first video data containing a plurality of frames and second video data having a spatial resolution higher than the frames contained in the first video data and a temporal resolution lower than the frames contained in the first video data;
magnifying the frames of the first video data to generate a plurality of magnified frames;
detecting a motion vector between each sequential frame pair of the magnified frames; and
performing, based on the second video data received by the receiving unit and the motion vector detected by the motion prediction unit, motion compensation in sequential order from one of the magnified frames associated with a time that corresponds to a time associated with the second video data, and sequentially generating motion compensated image data corresponding to the first video data based on the motion compensated frame and the motion vector,
wherein the motion compensated image data is sequentially generated by combining, at a predetermined ratio, a reference block of a first frame of the second video data specified by a respective motion vector, and a corresponding reference block of a second frame of the plurality of magnified frames that is immediately subsequent in time to the first frame of the second video data and belonging to a corresponding respective frame pair of the magnified frames used to generate the respective motion vector, to thereby generate an intermediate created picture,
wherein the predetermined ratio is based upon a difference amount between the reference block of the first frame of the second video data and the corresponding reference block of the second frame of the plurality of magnified frames.

15. The computer-readable medium according to claim 14, wherein the motion compensated image data is sequentially generated by repeating the combining by using the generated intermediate created picture as a next first frame of the second video data, to thereby generate an ultimate created picture.

16. The computer-readable medium according to claim 14, wherein the motion compensated image data is sequentially generated by combining pixels of reference blocks of the second video data specified by respective motion vectors and pixels of corresponding reference blocks of the magnified frames at the predetermined ratio.

17. The computer-readable medium according to claim 14, wherein when the difference amount is less than a predetermined value, the first frame of the second video data is outputted, without performing motion compensation, as the intermediate created picture.

18. The computer-readable medium according to claim 14, wherein the intermediate created picture is generated for the second video data to thereby increase the temporal resolution of the second video data.

* * * * *